(12) United States Patent
Fukuda et al.

(10) Patent No.: US 10,508,904 B2
(45) Date of Patent: Dec. 17, 2019

(54) MARKER

(71) Applicant: Enplas Corporation, Saitama (JP)

(72) Inventors: Yasuyuki Fukuda, Saitama (JP); Yuta Kawamoto, Saitama (JP); Tomohiro Saito, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 16/324,182

(22) PCT Filed: Jul. 13, 2017

(86) PCT No.: PCT/JP2017/025520
§ 371 (c)(1),
(2) Date: Feb. 8, 2019

(87) PCT Pub. No.: WO2018/030063
PCT Pub. Date: Feb. 15, 2018

(65) Prior Publication Data
US 2019/0178636 A1    Jun. 13, 2019

(30) Foreign Application Priority Data

Aug. 9, 2016 (JP) .................................. 2016-156758

(51) Int. Cl.
G01B 11/26 (2006.01)
G01B 11/00 (2006.01)
G02B 3/00 (2006.01)

(52) U.S. Cl.
CPC ............. G01B 11/26 (2013.01); G01B 11/00 (2013.01); G02B 3/005 (2013.01)

(58) Field of Classification Search
CPC ....... G01B 11/26; G01B 11/272; G01B 11/27; G01C 15/004; G01C 15/002

USPC ........................................................ 356/138
See application file for complete search history.

(56) References Cited

U.S. PATENT DOCUMENTS 4,983,496 A * 1/1991 Newell .................. G11B 15/08
346/135.1
2011/0141272 A1* 6/2011 Uto ..................... G01N 21/9501
348/135

FOREIGN PATENT DOCUMENTS

JP    2012-145559 A    8/2012
JP    2013-025043 A    2/2013

OTHER PUBLICATIONS

International Search Report from International Application No. PCT/JP2017/025520 dated Aug. 22, 2017.

* cited by examiner

*Primary Examiner* — Md M Rahman
(74) *Attorney, Agent, or Firm* — Brundidge & Stanger, P.C.

(57) ABSTRACT

This marker comprises a plurality of convex-surface section disposed along the X-axis direction and a plurality of detection sections disposed so as to face the convex-surface sections. Each of the detection sections is located, in the protruding direction of the convex-surface sections, closer to the convex-surface section side than a focal point on an image surface of the convex-surface section of the first optical unit in the X direction and is located on a single plane located further on the opposite side from the protruding direction than the edge of the image surface. The image surface extends from the first optical unit to the nth optical unit in the X direction, where n is at least 2.

5 Claims, 11 Drawing Sheets

MARKER

TECHNICAL FIELD

The present invention relates to a marker.

BACKGROUND ART

An image display sheet including a lenticular lens and an image forming layer has been known as an indicator (marker) employing a combination of a lens and a mark. The lenticular lens has a configuration in which a plurality of cylindrical lenses are arranged side by side. The image forming layer serves as marks respectively corresponding to the cylindrical lenses. When the indicator is viewed from the convex surface portion side of the cylindrical lenses, a moved or deformed image of the marks is observed depending on viewpoints. The indicator is useful as a marker for recognizing the position, attitude, and/or the like of an object in the fields of Augmented Reality (AR), robotics, and/or the like. In addition, various studies have been conducted on the arrangement of marks for different uses, for example (see e.g., Patent Literature (hereinafter, referred to as "PTL") 1 and PTL 2).

CITATION LIST

Patent Literature

PTL 1
Japanese Patent Application Laid-Open No. 2013-025043
PTL 2
Japanese Patent Application Laid-Open No. 2012-145559

SUMMARY OF INVENTION

Technical Problem

For the aforementioned uses, the aforementioned marker may be required to detect a wide range of angles, to have improved sensitivity, or to achieve both of such detection and improved sensitivity. Possible solutions to both of such detection and improved sensitivity include a configuration in which a plurality of detection object parts adjacent to one another can be observed via a single convex surface portion (a method for image projection multiple times on the single convex surface portion). However, with such a solution, as the distance from the convex surface portion to one of the detection object parts to be projected on the convex surface portion in a direction in which the convex surface portions are arranged side by side is greater, the clearness of a projected image decreases because the aberration such as the curvature of image field of the convex surface portion is caused.

Accordingly, the aforementioned marker still has room for consideration in terms of achieving both of the detection of a wide range of angles and the improved sensitivity.

An object of the present invention is to provide a marker which can achieve both of the detection of a wide range of angles and the improved sensitivity.

Solution to Problem

The present invention provides a marker formed of an optically transparent material, the marker including: a plurality of optical units disposed along at least one arrangement direction, in which: each of the plurality of optical units includes a convex surface portion and a detection object part, the detection object part being disposed to correspond to the convex surface portion, the detection object part being disposed away from the convex surface portion in a direction opposite to a protruding direction in which the convex surface portion protrudes, and the detection object part being configured to be projected onto the convex surface portion in a form of an optically detectable image, all of detection object parts for respective plurality of optical units are located in a single plane, the single plane being located closer to the convex surface portion in the protruding direction than a focal point of the convex surface portion of any first one of the plurality of optical units in the at least one arrangement direction is to the convex surface portion, the focal point being located in an image field of the convex surface portion of the first one of the plurality of optical units, and the single plane being located away from an edge of the image field in the direction opposite to the protruding direction, and the image field extends in the at least one arrangement direction from the first one of the plurality of optical units to an n-th one of the plurality of optical units, where n is equal to or greater than 2.

Advantageous Effects of Invention

According to the present invention, a marker which can achieve both of the detection of a wide range of angles and the improved sensitivity is provided.

DESCRIPTION OF EMBODIMENTS

Hereinafter, descriptions will be given of a marker according to an embodiment of the present invention with reference to the attached drawings.

Embodiment 1

(Configuration of Marker)

Figure 1A:
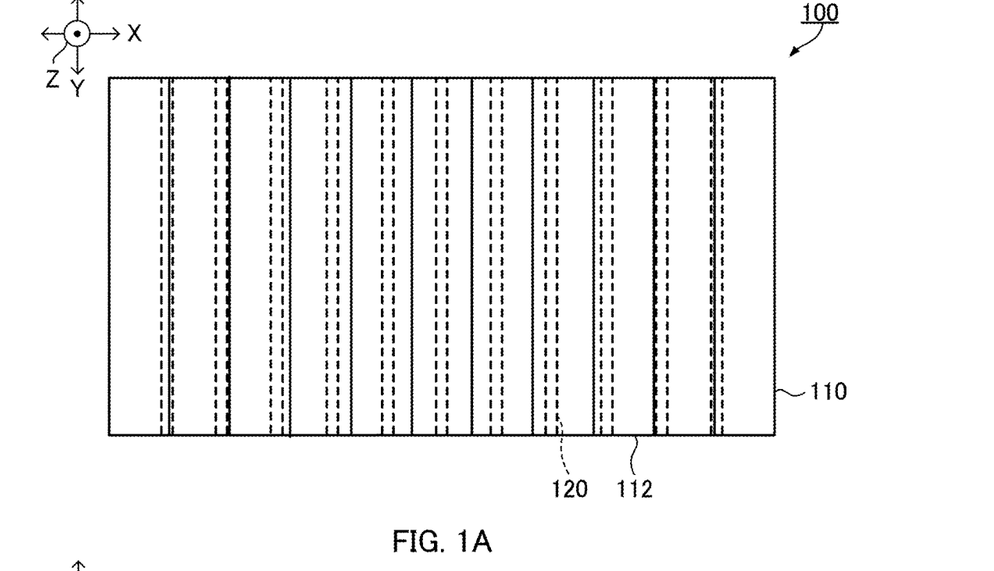
FIG. 1A is a schematic plan view illustrating a configuration of a marker according to Embodiment 1 of the present invention and FIG. 1B is a schematic sectional view illustrating the configuration of the marker in which hatching is omitted.
Figure 1B:
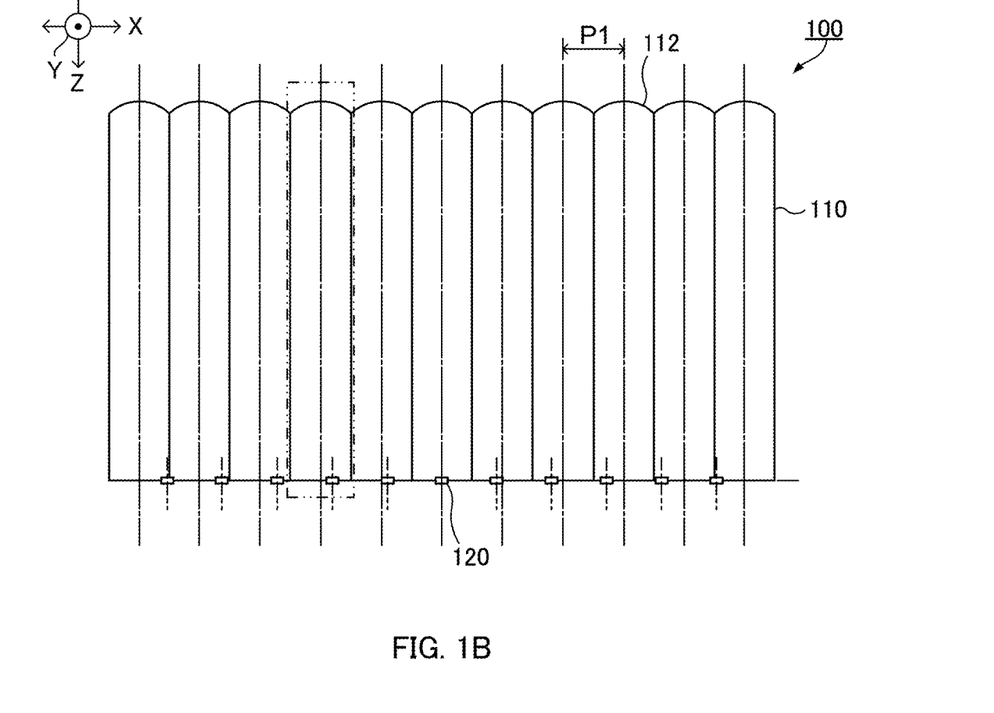

FIG. 1A is a schematic plan view illustrating a configuration of marker 100 according to Embodiment 1 of the present invention and FIG. 1B is a schematic front view illustrating the configuration of marker 100. Note that, the arrows in the figures represent X-, Y-, and Z-directions, respectively. The X-direction and the Y-direction are orthogonal to each other, and the Z-direction is orthogonal to both of the X-direction and the Y-direction.

As illustrated in FIGS. 1A and 1B, marker 100 is composed of lenticular lens portion 110 and detection object parts 120.

Lenticular lens portion 110 has a configuration in which a plurality of cylindrical lens portions are arranged in the X-direction and joined to one another, and is formed of an optically transparent material as a plate that is rectangular in plan view of the plate. Examples of the optically transparent material include transparent resins such as polycarbonates, acrylic resins, cycloolefin polymers (COPs), and cycloolefin copolymers (COCs); and materials other than resins, such as glass. The material of lenticular lens portion 110 is a cycloolefin copolymer (COC) having refractive index nd of 1.54, for example.

A plurality of convex surface portions 112 are formed on one face (surface) of lenticular lens portion 110 in the Z-direction. Convex surface portions 112 are portions of lenticular lens portion 110 protruding along the Z-direction and are arranged in the X-direction side by side. Each of convex surface portions 112 as seen in the Z-direction has the shape (shape in XY plane) of a rectangle elongated in the Y-direction in plan view. Each of convex surface portions 112 is a cylindrical lens, for example, and convex surface portion 112 as seen in the Y-direction has the shape (shape in YZ plane) of a circular arc protruding e.g., on one side (upward) in the Z-direction in front view.

A plurality of detection object parts 120 are disposed on the other face (rear surface) of lenticular lens portion 110 in the Z-direction. For example, a plurality of grooves each extending in the Y-direction and each having a rectangular sectional shape are disposed side by side in the X-direction in the rear surface of the lenticular lens portion. Each of the grooves contains therein a colored portion that is colored, e.g., in black. Each of detection object parts 120 is formed by such a groove and colored portion.

The aforementioned colored portion is formed, for example, from a coating film, and is solidified black paint, for example. Such paint is a fluid composite, and may, for example, be a liquid or powder. Application and solidification of such paint may be carried out through well-known techniques. Examples of methods of application of the aforementioned paint include spray coating and screen printing. In addition, examples of methods of solidification of the aforementioned paint include drying of the paint, curing of a curable composition (such as radical polymerizable compound) contained in the paint, and baking of powder.

Center-to-center distance (pitch) P1 of convex surface portions 112 in the X-direction is 0.5 mm, for example, and the width (length in the X-direction) of the aforementioned groove of detection object part 120 is 0.1 mm. Meanwhile, one optical unit is configured by one convex surface portion of lenticular lens portion 110 and one detection object part corresponding to this convex surface portion as illustrated in a part of FIG. 1B boxed with a two-dot chain line.

More specifically, the aforementioned optical unit is demarcated by lines at equal distances from the adjacent convex surface portions in the X-direction. Although the aforementioned detection object part is included in the corresponding optical unit typically entirely in this case, part of the detection object part may be out of the corresponding optical unit as long as light fluxes from a corresponding convex surface portion fully converges on the detection object part (e.g., without falling outside the detection object part).

Figure 2A:
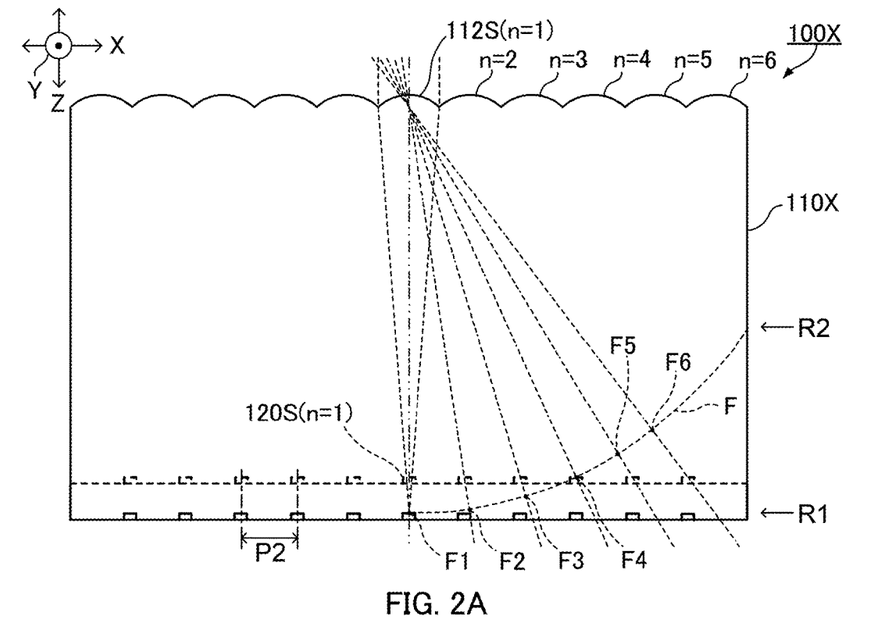
FIG. 2A schematically illustrates a configuration of a hypothetical marker and FIG. 2B schematically illustrates the configuration of the marker according to the embodiment.
Figure 2B:
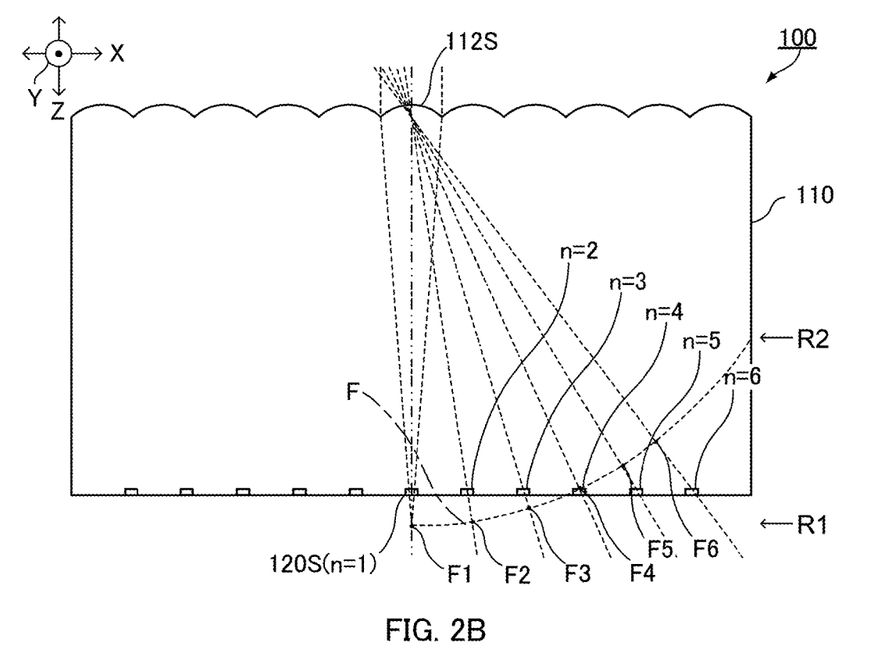

FIG. 2A schematically illustrates a configuration of a hypothetical marker and FIG. 2B schematically illustrates the configuration of marker 100. Arrangement of detection object parts 120 in the X-direction of marker 100 is the same as that of hypothetical marker 100X.

Convex surface portions 112 in hypothetical marker 100X are the same as those of marker 100. Lenticular lens portion 110X in hypothetical marker 100X has a thickness slightly greater than the thickness of marker 100 as described in detail later. The sizes and arrangement in the X-direction of detection object parts 120 in hypothetical marker 100X are the same as the sizes and arrangement of detection object parts 120 in marker 100.

Detection object parts 120 in hypothetical marker 100X are disposed in the X-direction at a distance from one another slightly smaller than pitch P1 of convex surface portions 112. The center-to-center distance of detection object parts 120 adjacent to one another in the X-direction in hypothetical marker 100X is denoted by P2, for example, and P2 is shorter than pitch P1 of convex surface portions 112 by certain length G (P2=P1−G).

As understood, in hypothetical marker 100X, detection object parts 120 are disposed in the X-direction such that their images projected on convex surface portions 112 are observed as if the images approach toward the observer side in the X-direction and move from the center to the edge of the marker in the X-direction while the marker is relatively tilted from a position right above the marker within a range of detectable angles (e.g., ±30 degrees).

Here, in both of marker 100 and hypothetical marker 100X, any (first) optical unit in the X-direction described above is an optical unit including one of the convex surface portions 112 and one of the detection object parts 120 in which a normal passing through the center of said convex surface portion 112 in the XZ plane passes through the center of said detection object part 120 corresponding to this convex surface portion 112, and the convex surface portion and detection object part are referred to as reference convex surface portion 112S and reference detection object part 120S, respectively. Reference detection object part 120S is the first (n=1) detection object part, one of the detection object parts adjacent to the first detection object part on one side in the X-direction is the second (n=2) detection object part, and a detection object part adjacent to the second detection object part is the third (n=3) detection object part. In the aspects of both of marker 100 and hypothetical marker 100X, n is up to 6, for example.

In hypothetical marker 100X, image field F of reference convex surface portion 112S extends in the X-direction from the first optical unit to the n-th optical unit. That is, reference convex surface portion 112S is formed so as to allow light fluxes to converge on each of detection object parts 120 of n=1 to 6 within the range (e.g., ±30 degrees or greater) of the detectable angles of marker 100. The focusing points of light fluxes travelling from reference convex surface portion 120S toward first to sixth detection object parts 120 are denoted by F1 to F6, respectively.

F1 is a focusing point of the light fluxes travelling toward first detection object part 120 (reference detection object part 120S, n=1), and is a focal point on the optical axis of reference convex surface portion 112S. As for focusing points F2 to F6, light fluxes are focused at positions closer to convex surface portions 112 because of incidence angles than F1 is to convex surface portions 112. Focusing points F1 to F6 are on image field F in the figures (XY plane).

Image field F is a curved surface protruding in a direction opposite to the protruding direction in which convex surface portion 112 protrudes and being formed mainly by the curvature of image field. Image field F of reference convex surface portion 112S is illustrated as a curve because of the curvature of image field of reference convex surface portion 112S.

As illustrated in FIGS. 2A and 2B, detection object parts 120 in marker 100 are on a single plane located closer to convex surface portions 112 in the Z-direction than a plane of detection object parts 120 in hypothetical marker 100X is to its convex surface portions 112. Such a single plane is located closer to convex surface portions 112 in the Z-direction than position R1 of focal point F1 in image field F of reference convex surface portion 112S of first one of the optical units in the X-direction is to convex surface portions 112, and the single plane is also located away from position R2 of an edge of image field F on the opposite to convex surface portions in the Z-direction. The edge of the image field F is expressed by an intersection of image field F with one of the lateral edges of the n-th optical unit which is farther from the first optical unit in FIG. 2B. As is clear from FIG. 2B, the aforementioned single plane is located in the vicinity of focusing point F4 in the Z-direction (position at which focusing point F4 is located on the surface of fourth detection object part 120) in marker 100.

In both of marker 100 and hypothetical marker 100X, the first to the sixth detection object parts 120 are projected on each of convex surface portions 112 such that the images of the first to the sixth detection object parts 120 appear cyclically in the X-direction of the marker. That is, six images of the detection object parts are projected on each one of convex surface portions 112 by relatively tilting the angle for observation of the marker.

For example, when marker 100 is viewed at the first angle to the Z-direction (e.g., along the Z-direction), the image of reference detection object part 120S (first detection object part 120 (n=1)) that is the closest to reference convex surface portion 112S is projected on reference convex surface portion 112S. When the angle to the Z-direction of marker 100 is enlarged relatively, individual detection object parts 120 are projected sequentially as images on corresponding individual convex surface portions 112 as if the images approach on the observation side in the X-direction. Accordingly, the aforementioned images cyclically appear on all of convex surface portions 112 of marker 100.

When marker 100 is viewed while being relatively tilted to the second angle to the Z-direction, the image of second detection object part 120 (n=2) is projected on reference convex surface portion 112S. When the angle to the Z-direction of marker 100 is relatively enlarged further, respective second detection object parts 120 for convex surface portions 112 are projected as images on corresponding convex surface portions 112 sequentially as if the images approach on the observation side in the X-direction, and the aforementioned images also cyclically appear on all of convex surface portions 112.

Correspondingly, as for third (n=3) and subsequent detection object parts 120, when marker 100 is viewed while being relatively tilted gradually, the images of detection object parts 120 of certain numbers are projected on convex surface portions 112 sequentially, and the images also cyclically appear on all of the convex surface portions 112 of marker 100 in the aforementioned direction. Thus, when marker 100 is relatively tilted to the maximum detection angle of marker 100, the image of each of detection object parts 120 cyclically appears n times in the X-direction in marker 100.

Figure 3:
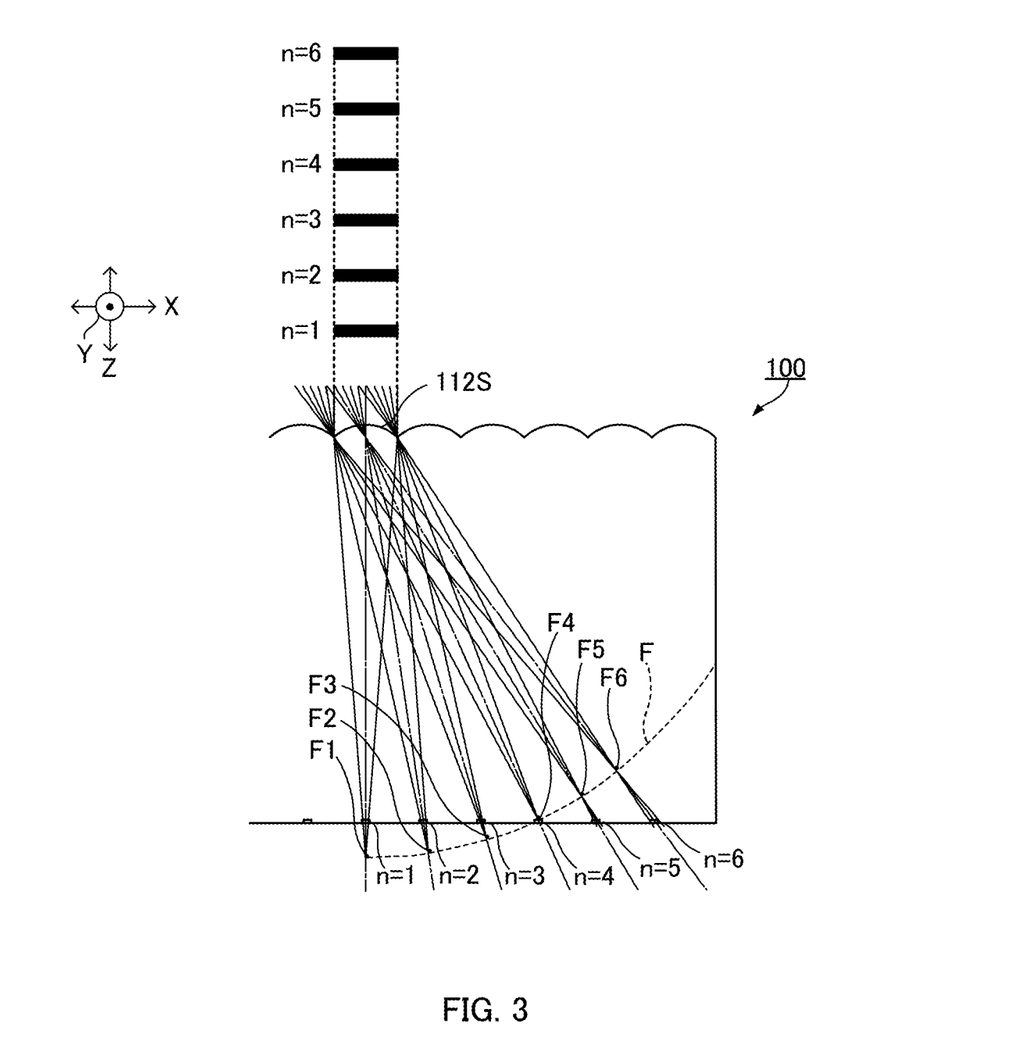
FIG. 3 schematically illustrates light fluxes travelling from a reference convex surface portion toward detection object parts and images projected on the reference convex surface portion in the marker according to the embodiment.

All of the images of the first to sixth detection object parts are projected on convex surface portions 112 sufficiently clearly in marker 100. FIG. 3 schematically illustrates light fluxes travelling from reference convex surface portion 112S toward detection object parts 120 and images projected on reference convex surface portion 112S in marker 100.

As illustrated in FIG. 3, the light fluxes from reference convex surface portion 112S are converged on each of first to sixth detection object parts 120 without falling outside any of detection object parts 120 in marker 100. Therefore, the image of each of first to sixth detection object parts 120 is projected over the entire range of reference convex surface portion 112S in the X-direction.

Specifically, focusing point F4 is located on the surface of fourth detection object part 120 (n=4) in marker 100. In general, the effect of the aberration due to the curvature of image field of reference convex surface portion 112S on those detection object parts 120 for which n is smaller than four (the first to the third detection object parts 120) is smaller than on fourth detection object part 120 and the effect of the aberration due to the curvature of image field of reference convex surface portion 112S on those detection object parts 120 for which n is greater than four (the fifth and the sixth detection object parts 120) is greater than on fourth detection object part 120.

In marker 100, since focusing point F4 is located on the surface of fourth detection object part 120 (n=4), the aforementioned effect of the aberration is mitigated on image formation of those detection object parts 120 which are more affected by the aforementioned effect of the aberration and for which n is greater. Moreover, the images of those detection object parts 120 which are less affected by the aforementioned effect of the aberration are projected on reference convex surface portion 112S sufficiently clearly. Therefore, marker 100 is advantageous for projecting the images of all of first to sixth detection object parts 120 on reference convex surface portion 112S sufficiently clearly.

Figure 4:
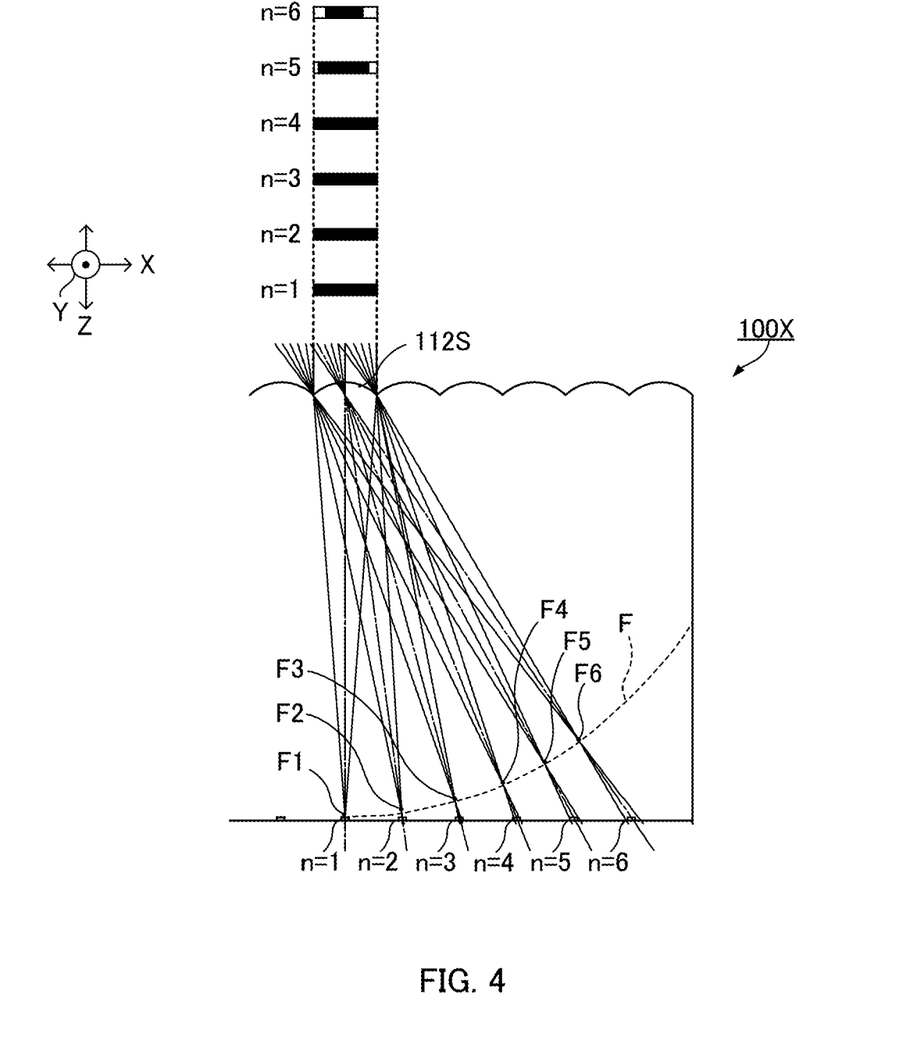
FIG. 4 schematically illustrates light fluxes travelling from a reference convex surface portion toward detection object parts and images projected on the reference convex surface portion in the aforementioned hypothetical marker.

In hypothetical marker 100X as opposed to marker 100, the clearness of images projected on reference convex surface portion 112S decrease with increasing distance from reference detection object part 120S. FIG. 4 schematically illustrates light fluxes travelling from reference convex surface portion 112S toward detection object parts 120 and images projected on reference convex surface portion 112S in hypothetical marker 100X.

As illustrated in FIG. 4, the light fluxes from reference convex surface portion 112S converge the most on reference detection object part 120S, and the width of light fluxes with respect to detection object parts 120 increases with increasing n in hypothetical marker 100X. In addition, part of the light fluxes falls slightly outside fifth detection object part 120 on its opposite end sides in the X-direction and greater part the light fluxes falls outside sixth detection object part 120 on its opposite end sides in the X-direction, so that the fifth and the sixth images are projected on reference convex surface portion 112S as images partly lacking in the X-direction (e.g., on the opposite end sides).

Note that, although an image defect caused by such insufficient convergence of light fluxes has been described as a lack in the image in the above descriptions, the image defect may actually be observed as image defects other than the aforementioned lack in the image, such as those including a decrease in contrast in the image, or may be observed as a combination of different image defects. Consequently, the greater the angle of hypothetical marker 100X to the Z-direction is, the more insufficient the accuracy for detecting an angle may become.

As described above, marker 100 has an angle detection range equivalent to that of hypothetical marker 100X, and when marker 100 is seen within the angle detection range, an image to be projected on one of convex surface portions 112 cyclically appears n times on all of convex surface portions 112 of marker 100. As understood, it can almost be said that the detection of marker 100 is performed with the optical units that are arranged as if the optical units are n times longer (n times more) within the angle detection range equivalent as compared to hypothetical marker 100X. Thus, marker 100 can detect an angle with a higher sensitivity than conventional markers can in which images cyclically appear within the aforementioned detectable angles.

Figure 5:
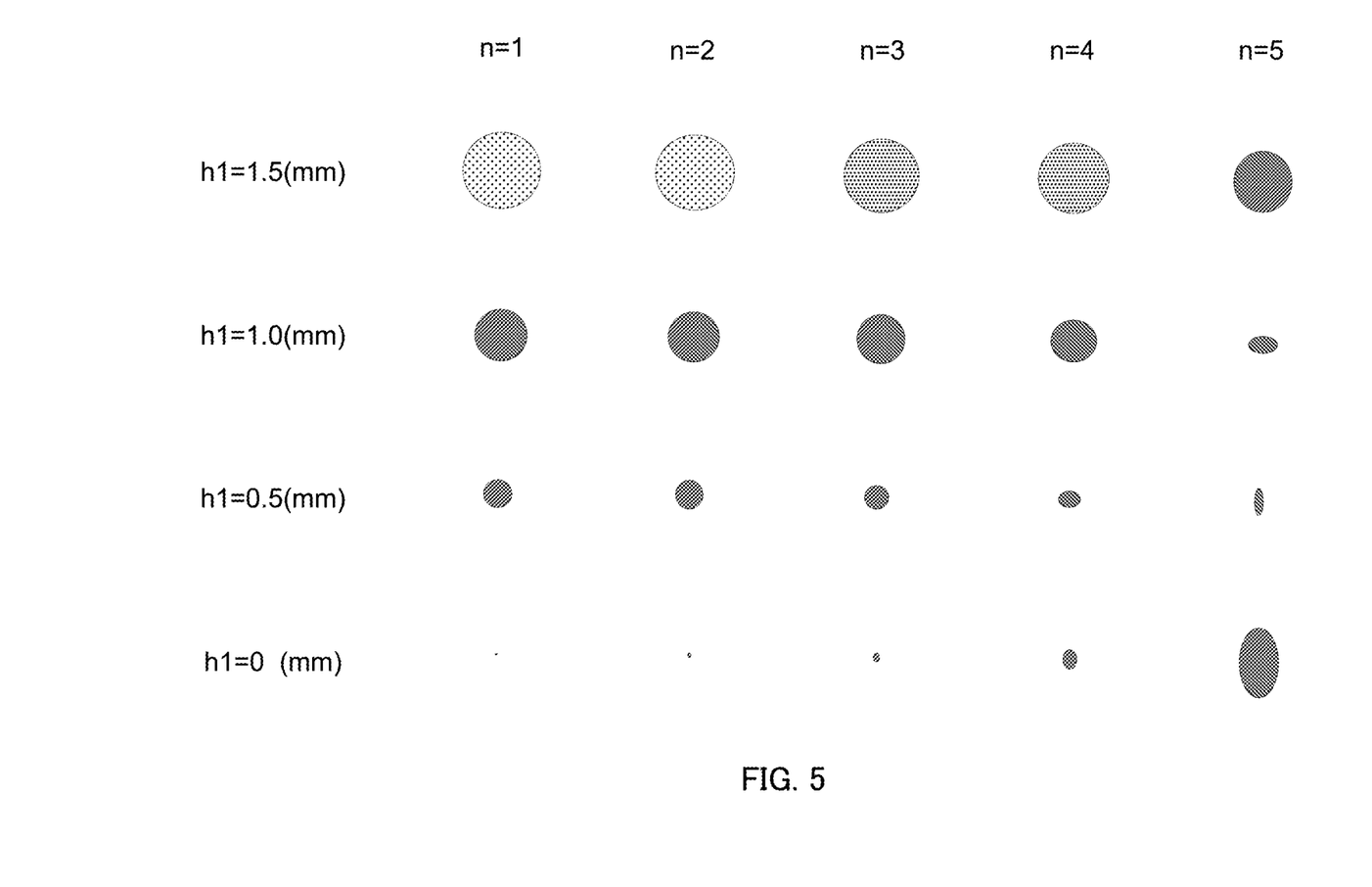
FIG. 5 schematically illustrates a spot diagram result obtained while changing the positions in the Z-direction of detection object parts each having a circular shape in plan view in the marker.

As described above, all of detection object parts 120 are located on a single plane in marker 100. The position of this single plane, namely, the positions of detection object parts 120 in the Z-direction can be appropriately determined based on a simulation using a computer, based on measured results of a trial product, and/or the like. FIG. 5 schematically illustrates a spot diagram result obtained while changing the positions in the Z-direction of detection object parts each having a circular shape in plan view.

This spot diagram is obtained by tracing light beams of incident light that is incident on convex surface portions and by plotting spots at arrival positions of the light beams in a plane located at a position of detection object parts in the Z-direction. Note that, the convex surface portions are replaced in this simulation with convex lenses having the shape of a circle in plan view whose diameter is a length of the convex surface portion in the X-direction. Note also that, the subject of simulation is from reference detection object part 120S to fifth detection object part 120.

In a case where the positions of the surfaces of detection object parts 120 in the Z-direction are at a position of focal point F1 (first position) of reference detection object part 120S in the Z-direction, the image of reference detection object part 120S (n=1) is the clearest. As n increases, the image becomes longer perpendicularly (along the Y-direction) and bigger while having a sufficiently high contrast.

In a case where the positions of the surfaces of detection object parts 120 in the Z-direction are at a second position closer to convex surface portions 112 than the position of focal point F1 of reference detection object part 120S is, all of the images of detection object parts 120 have a sufficiently high contrast and have similar sizes. The fourth image has a slightly flat shape in the X-direction, and the fifth image has a slightly flat shape in the Y-direction.

In a case where the positions of the surfaces of detection object parts 120 in the Z-direction are at a third position closer to convex surface portions 112 than the aforementioned second position is, all of the images of detection object parts 120 also have a sufficiently high contrast and have similar sizes. The fifth image has a slightly flat shape in the X-direction.

In a case where the positions of the surfaces of detection object parts 120 in the Z-direction are at a fourth position closer to convex surface portions 112 than the aforementioned third position is, all of the images of detection object parts 120 also have sizes greater than the sizes in the other cases and have similar sizes. About the contrasts of the images, the first and the second images have fairly thin contrasts, the third and the fourth images have slightly thin contrasts, but the fifth image has a sufficiently high contrast like in the other cases.

As described above, the above simulation shows that the tendency and the degree of clearness of images projected on convex surface portions 112 which depend on the position of detection object parts 120 in the Z-direction can be checked, and it is preferable to choose the position of detection object parts 120 in the Z-direction within a range from the second to the fourth positions described above.

It is possible to decide, depending on conditions where the marker is used, which value to use as the position of detection object parts 120 in the Z-direction. For example, when detecting the aforementioned images based on contrasts, it is considered appropriate to choose the position of detection object parts 120 in the Z-direction from the range from the second to the third positions, and when detecting the aforementioned images based on sizes or shapes, it is considered appropriate to choose from the range from the third to the fourth positions.

The positions of aforementioned focusing points F1 to F5 (in particular, F2 to F5) may be changed by aberrations other than the curvatures of image field of convex surface portions 112, and the aforementioned images may be affected by factors other than the position of image field F. Therefore, it is preferable that a trial product be further manufactured based on the simulation result and the aforementioned position of detection object parts 120 in the Z-direction be lastly decided taking into consideration an actual measurement result of images projected on the convex surface portions.

As is clear from the above descriptions, marker 100 is optically transparent and includes the plurality of optical units disposed along the X-direction, in which each of the plurality of optical units includes convex surface portion 112 and detection object part 120, detection object part 120 is disposed to correspond to convex surface portion 112, detection object part 120 is disposed away from convex surface portion 112 in a direction opposite to a protruding direction in which convex surface portion 112 protrudes, detection object part 120 is configured to be projected onto convex surface portion 120 in the form of an optically detectable image, all of detection object parts 120 are located on a single plane, the single plane is located closer to convex surface portions 112 in the protruding direction than focal point F1 located in image field F of reference convex surface portion 112S of any first one of the plurality of optical units in the arrangement direction is to convex surface portions 112, the single plane is also located away from an edge of image field F in the direction opposite to the protruding direction, and image field F extends in the X-direction from the first optical unit to an n-th optical unit, where n is equal to or greater than 2. Therefore, in detection of a wide range of angles, marker 100 can detect a wide range of angles with a sensitivity n times higher in comparison with the conventional markers in which images of detection objection parts cyclically appear.

In addition, it is even more effective that n is six or less from a viewpoint of fully achieving both of detection of a wide range of angles and of improvement in sensitivity.

Further, it is more effective that detection object part 120 of m-th one (where m is equal to or greater than 2 and less than n) of the optical units in the X-direction is located at a position where the surface of this detection object part 120 crosses the image field from a viewpoint of projecting all of the images of first to n-th detection object parts 120 on each of convex surface portions 112 sufficiently clearly, and it is still more effective from the aforementioned viewpoint that the aforementioned m is equal to or greater than n/2.

Embodiment 2

Figure 6A:
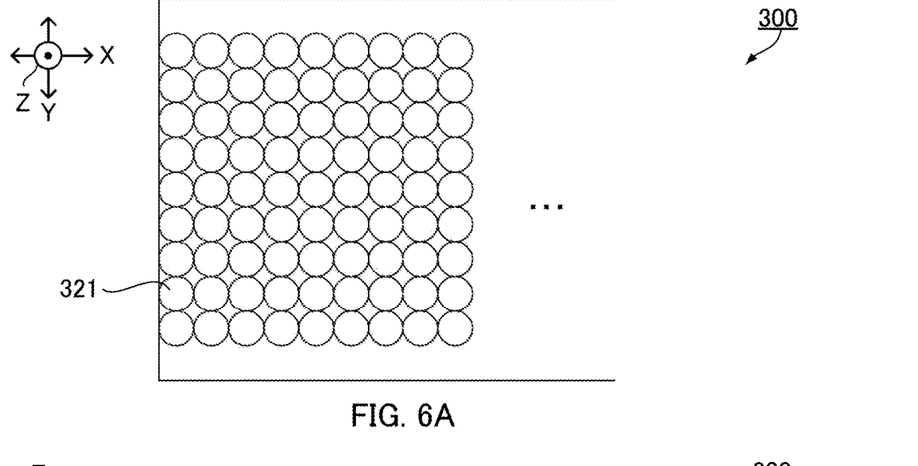
FIG. 6A is a schematic plan view illustrating a configuration of a marker according to Embodiment 2 of the present invention.
Figure 6B:
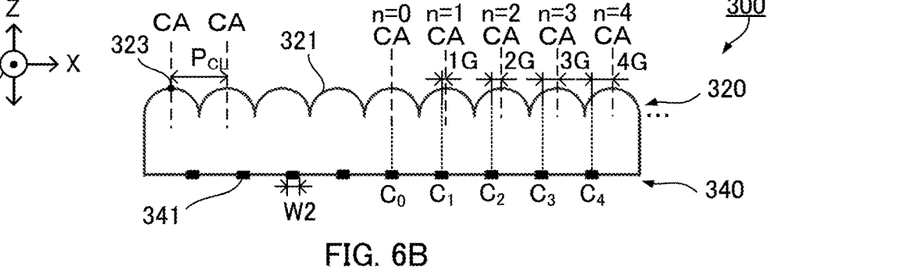
FIG. 6B is an enlarged schematic sectional view, in which hatching is omitted, of principal parts of the aforementioned marker.
Figure 6C:
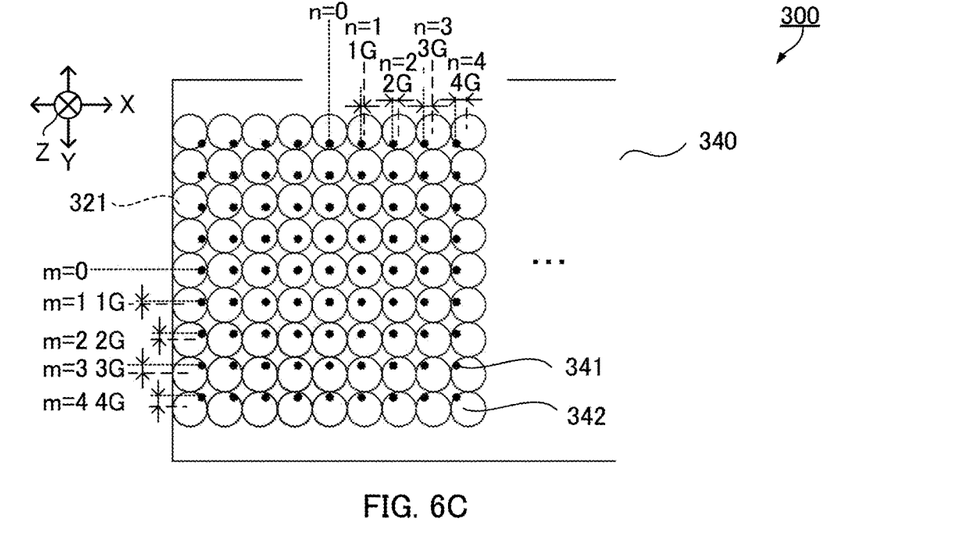
FIG. 6C is a schematic bottom view illustrating the configuration of the aforementioned marker.

FIGS. 6A to 6C illustrate a configuration of marker 300 according to Embodiment 2 of the present invention. FIG. 6A is a plan view of marker 300 according to Embodiment 2 of the present invention, FIG. 6B is a partly-enlarged sectional view of marker 300 in which hatching is omitted, and FIG. 6C is a bottom view of marker 300.

As illustrated in FIGS. 6A to 6C, marker 300 according to Embodiment 2 includes first surface 320 and second surface 340. First surface 320 includes a plurality of convex surfaces 321. In addition, second surface 340 includes a plurality of first regions 341 and second regions 342.

Convex surfaces 321 are each circular in plan view, and each have the same size. For example, the diameter of convex surface 321 in plan view is 440 μm, and pitch $P_{CL}$ of convex surfaces 321 is 440 μm in both of the first direction (X-direction) and the third direction (Y-direction). The term "pitch of convex surfaces 321" as used in this context means the distance between the centers (vertices 323 or central axes CA) of adjacent convex surfaces 321. Additionally, the term "central axis CA of convex surface 321" means a straight line passing through the center of convex surface 321 in plan view of convex surface 321 and extending along the second direction (Z-direction). Further, the term "vertex 323 of convex surface 321" means an intersection of convex surface 321 and central axis CA.

Each of the plurality of convex surfaces 321 is substantially semicircular in the section of marker 300 taken along the height direction (the Z-direction) of marker 300. That is, since central axis CA of convex surface 321 is a straight line parallel to the second direction (Z-direction), convex surface 321 is substantially hemispherical. That is, convex surface 321 is rotationally symmetrical about central axis CA as a rotational axis. Additionally, focal points F3 of convex surfaces 321 are located farther from convex surfaces 321 than first regions 341 are from convex surfaces 321 as seen from convex surfaces 321. In other words, first regions (detection object parts) 341 are disposed nearer convex surfaces 321 than the focal position of the surface (first surface) 320 is.

Additionally, marker 300 includes, on its rear surface side, first regions 341 disposed at positions respectively corresponding to convex surfaces 321. For example, first regions 341 are each circular in plan view, and each have a diameter of 45 μm and a depth of 10 μm.

The center-to-center distance ($|C_n-C_{n-1}|$) of first regions 341 adjacent to each other in the first direction (the X-direction) is $P_{CL}$-nG μm, and the center-to-center distance ($|C_m-C_{m-1}|$) of first regions 341 adjacent to each other in the third direction (the Y-direction) is $P_{CL}$-mG μm. The "n" represents an order of a certain convex surface 321 with respect to 0th convex surface 321 in the first direction (the X-direction). The "m" represents an order of a certain convex surface 321 with respect to 0th convex surface 321 in the third direction (the Y-direction).

As understood from the above descriptions, first regions 341 corresponding to convex surfaces 321 located at respective distances from central convex surface 321 (n=0) in the first direction (the X-direction) are disposed to be offset on the side of central convex surface 321 (n=0) in the first direction (the X-direction) from central axes CA of corresponding convex surfaces 321, respectively. In addition, first regions 341 corresponding to convex surfaces 321 located at respective distances from central convex surface 321 (m=0) in third direction (the Y-direction) are disposed to be offset on the side of central convex surface 321 (n=0) in the third direction (the Y-direction) from central axes CA of corresponding convex surfaces 321, respectively. That is, in the first direction (the X-direction) and the third direction (the Y-direction), the center-to-center distances of first regions 341 adjacent to each other are smaller than the distances between vertices 323 of convex surfaces 321 adjacent to each other in the present embodiment, respectively. In addition, also in the present embodiment, the widths of light fluxes formed by convex surfaces 321 are equal to or smaller than the width of each of first regions 341 at the height at which first regions 341 are disposed as seen in the section including the first direction (X-direction) and the height direction (Z-direction).

Convex surfaces 321 in the present embodiment correspond to the convex surface portions. First regions 341 correspond to the detection object parts. Additionally, second regions 342 are disposed to adjoin one another in the X- and Y-directions. The shape of each image field as seen in plan view in the present embodiment is a shape boxed with a line represented by equidistant points from second regions 342 arranged to one another, that is, the shape of a square circumscribing each of second region 342. In addition, the optical units in the present embodiment are each a region having the shape of a substantially quadrangular prism whose bottom face is a portion of second surface 340 having the aforementioned shape in plan view and whose top portion is convex surface 321.

The images of first regions 341 are observed n times as a sufficiently clear single image also in marker 300 according to the present embodiment when an observing angle is changed, which is however not illustrated in particular.

As described above, marker 300 according to the present embodiment has the same effect as marker 100 of Embodiment 1.

Embodiment 3

Figure 7A:
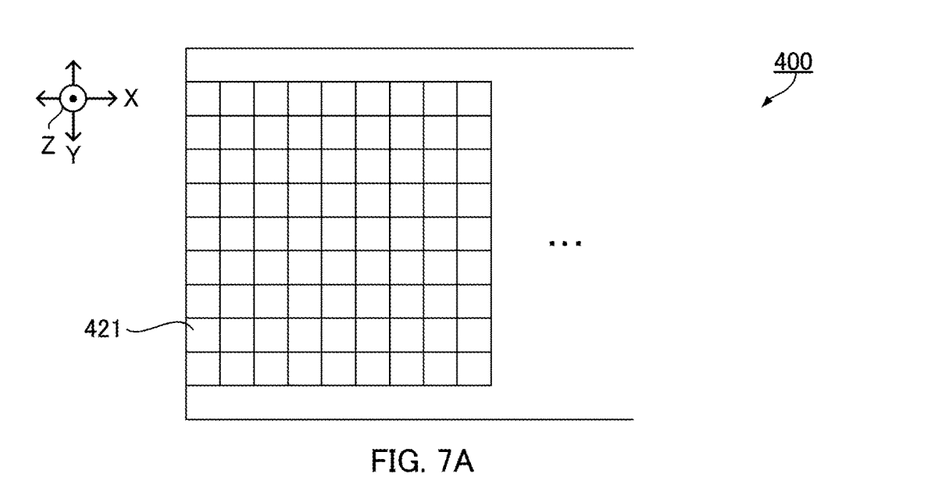
FIG. 7A is a schematic plan view illustrating a configuration of a marker according to Embodiment 3 of the present invention.

Marker 400 according to Embodiment 3 is identical to marker 300 according to Embodiment 2 except the shape of convex surfaces 421. Accordingly, the same components between marker 400 according to Embodiment 3 and marker 300 according to Embodiment 2 are provided with the same reference signs and the descriptions of such components are omitted.

Figure 7B:
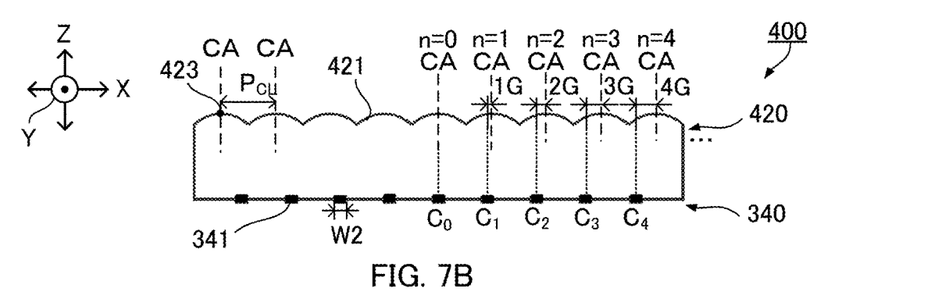
FIG. 7B is an enlarged schematic sectional view, in which hatching is omitted, of principal parts of the aforementioned marker.
Figure 7C:
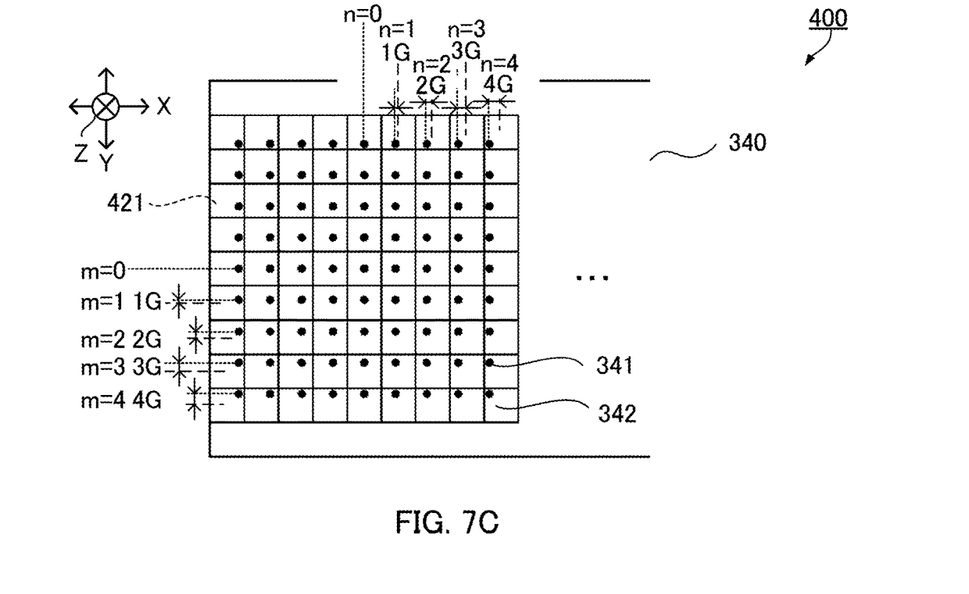
FIG. 7C is a schematic bottom view illustrating the configuration of the aforementioned marker.

FIGS. 7A to 7C illustrate the configuration of marker 400 according to Embodiment 3 of the present invention. FIG. 7A is a plan view of marker 400 according to Embodiment 3 of the present invention, FIG. 7B is a partly-enlarged sectional view of marker 400 in which hatching is omitted, and FIG. 7C is a bottom view of marker 400.

As illustrated in FIGS. 7A to 7C, marker 400 according to Embodiment 3 includes first surface 420 and second surface 340. First surface 420 includes a plurality of convex surfaces 421. In addition, second surface 340 includes a plurality of first regions 341 and second regions 342.

Convex surfaces 421 are each square in plan view, and each have the same size. For example, the length of each side of convex surface 421 in plan view is 440 µm, and pitch $P_{CL}$ of convex surfaces 421 is 440 µm in both of the first and the third directions. The term "pitch of convex surfaces 421" as used in this context means the distance between the centers (vertices 423 or central axes CA) of adjacent convex surfaces 421. Additionally, the term "central axis CA of convex surface 421" means a straight line passing through the center of convex surface 421 in plan view of convex surface 421 and extending along the second direction. Further, the term "vertex 423 of convex surface 421" means an intersection of convex surface 421 and central axis CA.

In the section of marker 400 taken along the height direction (the Z-direction) of marker 400, convex surfaces 421 are each a curve whose radius of curvature increases with increasing distance from vertex 423 of convex surface 421. Such a radius of curvature may increase with increasing distance from vertex 423 of convex surface 421, continuously or intermittently.

The center-to-center distance ($|C_n-C_{n-1}|$) of first regions 341 adjacent to each other in the first direction (the X-direction) or in the third direction (the Y-direction) is $P_{CL}$-nG µm, and the center-to-center distance ($|C_m-C_{m-1}|$) of first regions 341 adjacent to each other in the second direction is $P_{CL}$-mG µm. As described above, the "n" represents an order of a certain convex surface 421 with respect to 0th convex surface 421 in the first direction. The "m" represents an order of a certain convex surface 421 with respect to 0th convex surface 421 in the third direction.

As understood from the above descriptions, first regions 341 corresponding to convex surfaces 421 located at respective distances from central convex surface 421 (n=0) in the first direction (the X-direction) are disposed to be offset on the side of central convex surface 421 (n=0) in the first direction (the X-direction) from central axes CA of corresponding convex surfaces 421, respectively. In addition, first regions 341 corresponding to convex surfaces 421 located at respective distances from central convex surface 421 (m=0) in the third direction (the Y-direction) are disposed to be offset inward in the third direction (the Y-direction) from central axes CA of corresponding convex surfaces 421, respectively. That is, in the first direction (the X-direction) and the third direction (the Y-direction), the distances between vertices 423 of convex surfaces 421 adjacent to each other are greater than the center-to-center distances of first regions 341 adjacent to each other in the present embodiment. In addition, also in the present embodiment, the widths or radii of light fluxes formed by convex surfaces 421 are equal to or smaller than the width of each of first regions 341 at the height at which first regions 341 are disposed as seen in the section including the first direction and the height direction.

Convex surfaces 421 in the present embodiment also correspond to the convex surface portions, and first regions 341 correspond to the detection object parts. Additionally, the shape of each of second regions 342 as seen in plan view is a square and second regions 342 adjoin to one another in the X- and Y-directions in the present embodiment. The shape of the image field in the present embodiment as seen in plan view is the same as second regions 342. Moreover, the optical units in the present embodiment are each a region having the shape of a substantially quadrangular prism whose bottom face is second region 340 and whose top face is convex surface 421.

The image of first region 341 are observed n times as a sufficiently clear single image also in marker 400 according to the present embodiment when an observing angle is changed, which is however not illustrated in particular.

(Effect)

As described above, marker 400 according to the present embodiment has the same effect as marker 300 of Embodiment 2.

Note that, although the center-to-center distance of first regions 341 adjacent to each other is smaller than the distance between vertices 323 or 423 of convex surfaces 321 or 421 adjacent to each other in Embodiment 2 or 3, the center-to-center distance of first regions 341 adjacent to each other may be greater than the distance between vertices 323 or 423 of convex surfaces 321 or 421 adjacent to each other. In this case, a plurality of first regions 341 are disposed nearer convex surfaces 321 or 421 than the focal positions of the plurality of convex surfaces 321 or 421 are.

Figure 8:
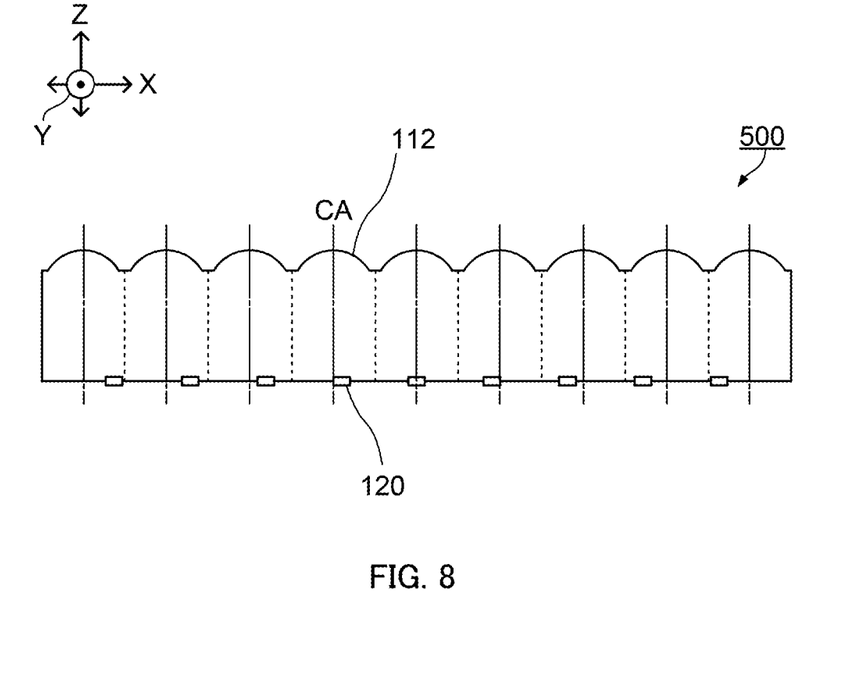
FIG. 8 is a schematic sectional view illustrating a configuration of a marker according to Embodiment 5 of the present invention in which hatching is omitted.

Note that, the aforementioned markers may have gaps between the convex surface portions adjacent to one another in the arrangement direction in which the convex surface portions are arranged. The optical units as seen in plan view each have a shape boxed with a line represented by middle points (equidistant points) between (from) the convex surface portions adjacent to each other in the arrangement direction of the convex surface portions. Accordingly, when the marker has the gaps between the convex surface portions, the region of each of the optical units in its plane surface direction extends to middle points of the gaps in the arrangement direction of the convex surface portions (equidistance point from the centers of the convex surface portions adjacent to each other in the aforementioned arrangement direction). For example, when the marker has the gaps (flat surface portions) between the rims of the convex surface portions in the arrangement direction of the convex surface portions as in marker 500 illustrated in FIG. 8, each of the optical units is represented as portions demarcated by the first surface, the second surface, and the dashed lines running in the Z-direction in FIG. 8.

Note that, the aforementioned detection object parts only have to make it possible to project optically detectable images on the convex surface portions. The phrase "optically detectable" means that there is an evident difference between the detection object parts and other portions in their optical characteristics. The term "optical characteristics" as used herein means, for example, the color attributes such as brightness, saturation, and hue, or the optical intensity such as luminance. The aforementioned difference can be determined appropriately depending on the use of the marker, and the difference may, for example, be a difference which can be visually checked, a difference which can be checked with an optical detection apparatus, or a difference which can be detected through an additional treatment such as UV lamp irradiation.

In addition, each of the aforementioned detection object parts may be a protrusion and a colored portion, for example. Moreover, the colored portion may be other than a coating film, and may be a colored seal, for example. Further, parts of the surface of the marker on the detection-object-part side other than the detection object parts may be depressions and protrusions formed of microscopic pyramidal prisms, a reflective surface or the like of an evaporated metal film, and/or the like. Furthermore, portions of the detection object parts other than the portions of the detection object parts which should be detected as images may be configured to be optically detectable (e.g., such portions may be colored, or may be composed of the depressions and protrusions, reflective surface, and/or the like described above).

It is preferable, from a viewpoint of the use in position detection, that the aforementioned marker be used in a state of being disposed with an additional suitable means to display directly or indirectly the number of times the images cyclically appear. Examples of the additional means include conventional markers which can detect the same range of angles and in which images cyclically appear.

Embodiment 6

Marker 600 according to Embodiment 6 is identical to marker 300 according to Embodiment 2 except second surface 640. Accordingly, the same components between marker 600 according to Embodiment 6 and marker 300 according to Embodiment 2 are provided with the same reference signs and the descriptions of such components are omitted.

Figures 9A, 9B, 9D:
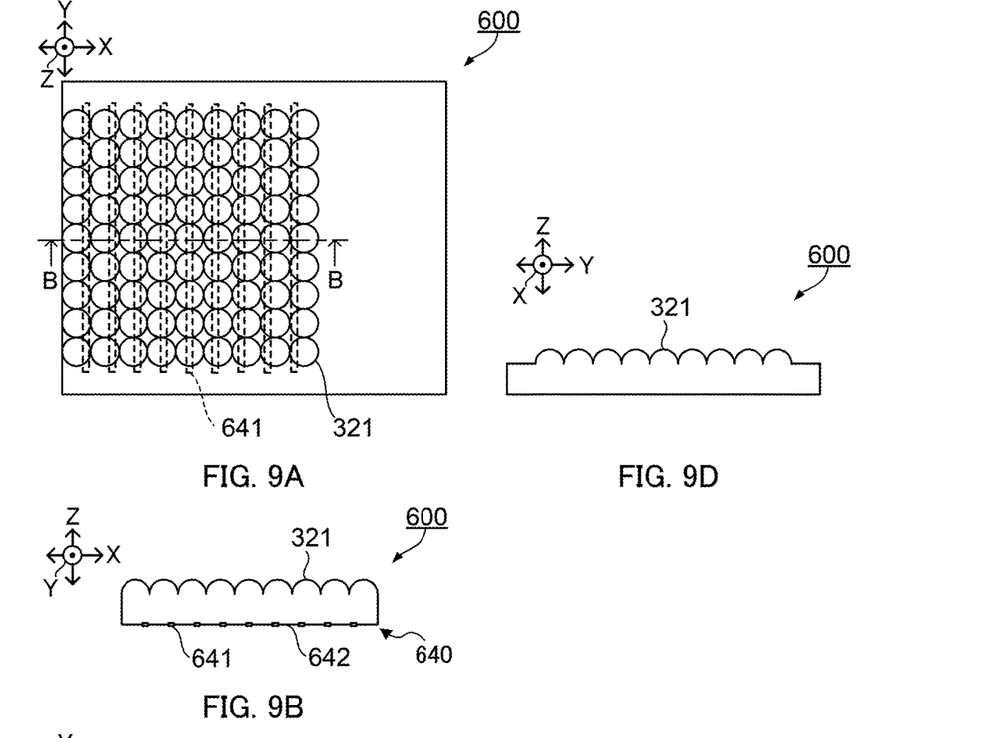
FIG. 9A is a plan view of a configuration of a marker according to Embodiment 6 of the present invention.
FIG. 9B is a partial sectional view, in which hatching is omitted, of a part of the marker taken along line B-B in FIG. 9A.
FIG. 9D is a side view of the marker.
Figure 9C:
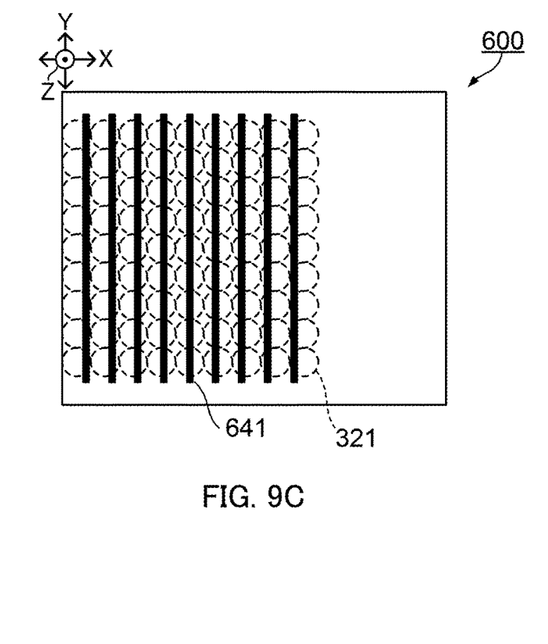
FIG. 9C is a bottom view of the marker.

FIG. 9A is a plan view of marker 600, FIG. 9B is a partial sectional view, in which hatching is omitted, of a part of marker 600 sectioned along line B-B in FIG. 9A, FIG. 9C is a bottom view of marker 600, and FIG. 9D is a side view of marker 600.

Second surface 640 is the same as that of Embodiment 1. That is, second surface 640 includes first regions 641 and second regions 642. First regions 641 are each a rectangular recess elongated along the Y-direction in the XY plane, and are each formed at a position where first region 641 extends across convex surfaces 321 lined along the Y-direction. In addition, second regions 642 are arranged alongside one another in the X-direction to correspond to the lines of convex surfaces 321.

Observed in marker 600 are linear images along the Y-direction as groups of individual images respectively projected on convex surfaces 321. These linear images are observed as if the linear images move in a direction toward the viewer as marker 600 is tilted to the viewer side with respect to the X-direction.

(Effect)

Marker 600 according to the present embodiment has the advantage that the contrast of the image in the Y-direction is high since convex surface portions 321 are curved not only in the X-direction, but also in the Y-direction.

Embodiment 7

Marker 700 according to Embodiment 7 is identical to marker 600 according to Embodiment 6 except the configuration of convex surfaces 731. Accordingly, the same components between marker 700 according to Embodiment 7 and marker 600 according to Embodiment 6 are provided with the same reference signs and the descriptions of such components are omitted.

Figure 10A:
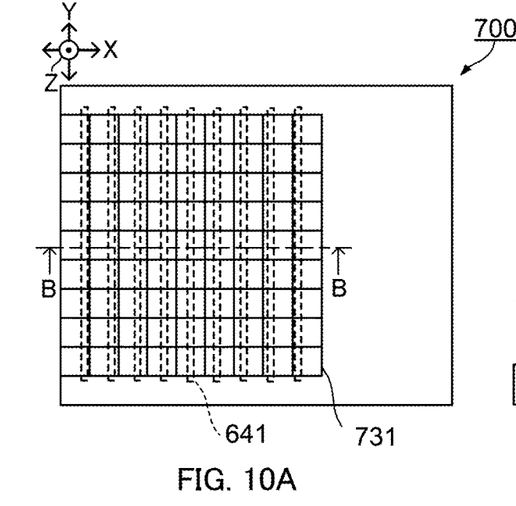
FIG. 10A is a plan view of a configuration of a marker according to Embodiment 7 of the present invention.
Figure 10B:
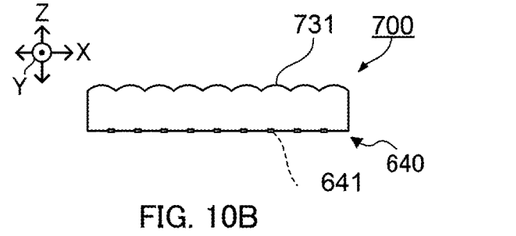
FIG. 10B is a partial sectional view, in which hatching is omitted, of a part of the marker taken along line B-B in FIG. 10A.
Figure 10C:
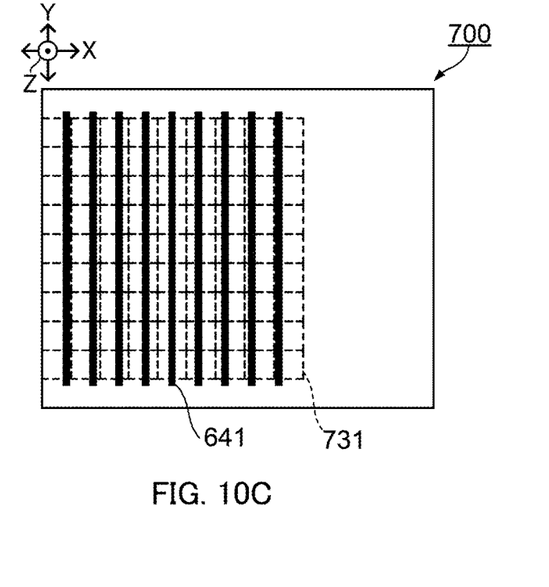
FIG. 10C is a bottom view of the marker.
Figure 10D:
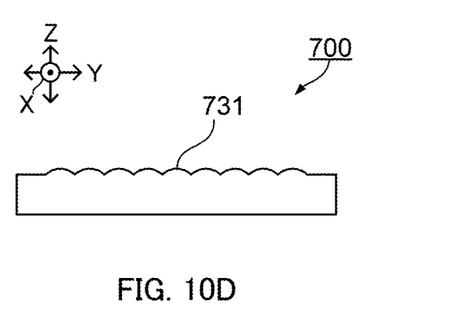
FIG. 10D is a side view of the marker.

FIG. 10A is a plan view of marker 700, FIG. 10B is a partial sectional view, in which hatching is omitted, of a part of marker 700 sectioned along line B-B in FIG. 10A, FIG. 10C is a bottom view of marker 700, and FIG. 10D is a side view of marker 700.

Convex surfaces 731 in Embodiment 7 are each square in plan view. In addition, the shape of each of convex surfaces 731 in the section along the optical axis of convex surface 731 is, for example, a curve whose radius of curvature increases with increasing distance from the vertex of convex surface 731.

(Effect)

In marker 700 according to the present embodiment, the advantage the same as marker 600 according to Embodiment 6 is provided and, in addition, images can be clearly detected irrespective of the intensity of light incident on the first surface of the lenticular lens portion. One possible reason for this may be that the first surface of marker 700 is composed substantially only of convex surface portions 731 (curved surfaces) and includes substantially no plane surface, and thus reflected light on the first surface is less likely to be generated or is weak in comparison with marker 600, while, in the case where the intensity of the incident light is high, the intensity of the reflected light in marker 700 such as the light reflected on the first surface is also high and the visibility of the images might be reduced accordingly.

Embodiment 8

Marker 800 according to Embodiment 8 is identical to marker 600 according to Embodiment 6 except the configuration of convex surfaces 731. Accordingly, the same components between marker 800 according to Embodiment 8 and marker 600 according to Embodiment 6 are provided with the same reference signs and the descriptions of such components are omitted.

FIG. 12A is a plan view of marker 800, FIG. 12B is a partial sectional view, in which hatching is omitted, of a part of marker 800 sectioned along line B-B in FIG. 12A, FIG. 12C is a bottom view of marker 800, and FIG. 12D is a side view of marker 800.

Figures 11A, 11D:
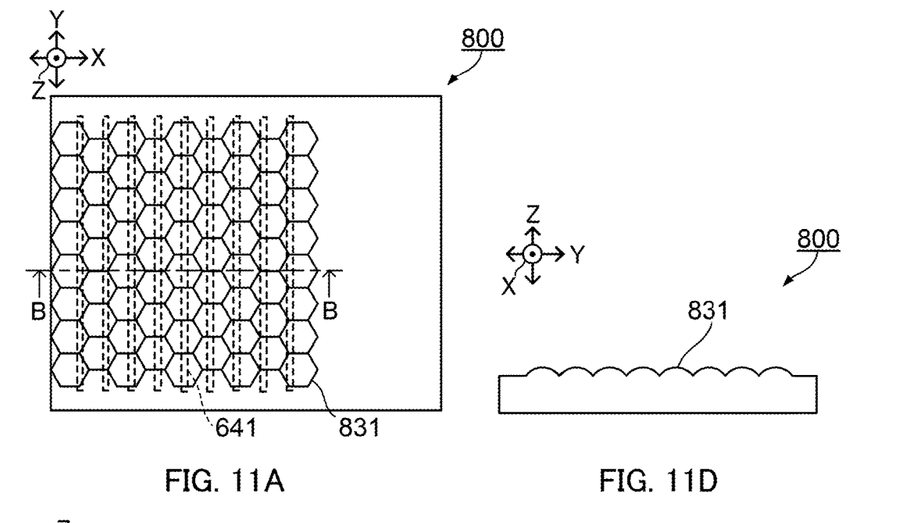
FIG. 11A is a plan view of a configuration of a marker according to Embodiment 8 of the present invention.
FIG. 11D is a side view of the marker.
Figure 11B:
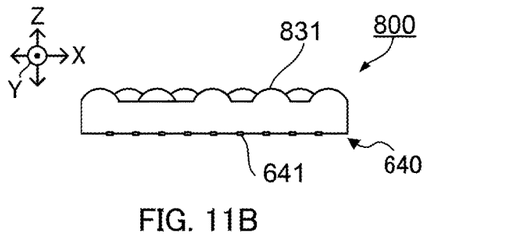
FIG. 11B is a partial sectional view, in which hatching is omitted, of a part of the marker taken along line B-B in FIG. 11A.
Figure 11C:
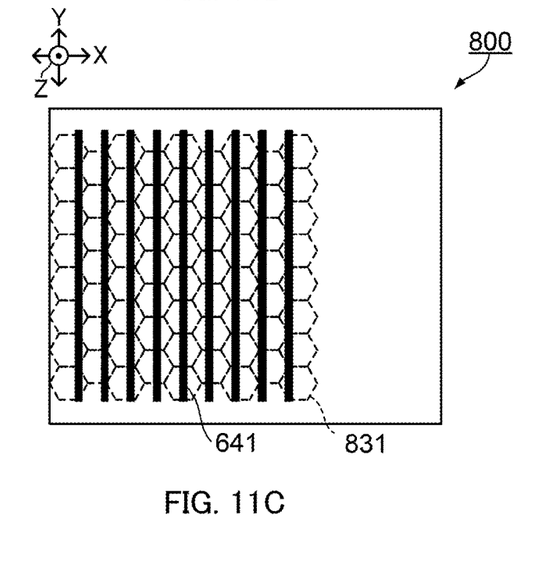
FIG. 11C is a bottom view of the marker.

Convex surfaces 831 in Embodiment 8 each have a regular hexagonal shape in plan view. In addition, the shape of each of convex surfaces 831 in the section along the optical axis of convex surface 831 is represented by a curve whose radius of curvature increases with increasing distance from the vertex of convex surface 831. In each of the lines of convex surfaces 831 arranged in the Y-direction, convex surfaces 831 are arranged to be in contact with one another along the Y-direction at their sides facing one another. In addition, the lines of convex surfaces 831 are arranged in the X-direction such that connected portions of convex surfaces 831 in one line are in contact with one corners of hexagonal convex surfaces 831 in another line. In this manner, in marker 800, convex surfaces 831 are fully closely arranged in a collective manner over the entire first surface of the lenticular lens portion, substantially.

(Effect)

Marker 800 according to the present embodiment has the same effect as marker 600 of Embodiment 6.

Note that, the center-to-center distance of first regions 441 adjacent to each other may be smaller or greater than the distance between the vertices of convex surfaces 731 or 831 adjacent to each other in Embodiments 6 to 8. When the center-to-center distance of first regions 641 adjacent to each other is smaller than the distance between the vertices of convex surfaces 731 or 831 adjacent to each other, a plurality of first regions 641 are disposed farther from convex surfaces 731 or 831 than the focal positions of the plurality of convex surfaces 731 or 831 are. When the center-to-center distance of first regions 641 adjacent to each other is greater than the distance between the vertices of convex surfaces 731 or 831 adjacent to each other, a plurality of first regions 641 are disposed nearer convex surfaces 731 or 831 than the focal positions of the plurality of convex surfaces 731 or 831 are.

The present patent application claims the benefit of priority based on Japanese Patent Application No. 2016-156758 filed on Aug. 9, 2016. The disclosure of the specification, drawings and abstract of the Japanese Patent Application is incorporated in the specification of the present application by reference in its entirety.

INDUSTRIAL APPLICABILITY

The marker according to the present invention is useful as a position detecting marker (or, an angle detecting marker) for recognizing the position, attitude, and/or the like of an object, and is particularly useful as a highly sensitive marker. Accordingly, the present invention is expected to contribute to further development in the technical field in which the position detection by the above-mentioned marker is utilized.

REFERENCE SIGNS LIST

100, 300, 400, 500, 600, 700, 800 Marker
100X Hypothetical marker
110 Lenticular lens portion
112, 212 Convex surface portion
112S Reference convex surface portion
120 Detection object part
120S Reference detection object part
320, 420 First surface
321, 421, 731, 831 Convex surface
340, 640 Second surface
323, 423 Vertex
341, 641 First region
342, 642 Second region
CA Central axis
F Image field
F1 Focal point (focusing point)
F2 to F6, Fn Focusing point

The invention claimed is:

1. A marker formed of an optically transparent material, the marker comprising:
   a plurality of optical units disposed along at least one arrangement direction, wherein:
   each of the plurality of optical units comprises a convex surface portion and a detection object part, the detection object part being disposed to correspond to the convex surface portion, the detection object part being disposed away from the convex surface portion in a direction opposite to a protruding direction in which the convex surface portion protrudes, and the detection object part being configured to be projected onto the convex surface portion in a form of an optically detectable image,
   all of detection object parts for respective plurality of optical units are located in a single plane, the single plane being located closer to the convex surface portion in the protruding direction than a focal point of the convex surface portion of any first one of the plurality of optical units in the at least one arrangement direction is to the convex surface portion, the focal point being located in an image field of the convex surface portion of the first one of the plurality of optical units, and the single plane being located away from an edge of the image field in the direction opposite to the protruding direction, and
   the image field extends in the at least one arrangement direction from the first one of the plurality of optical units to an n-th one of the plurality of optical units, where n is equal to or greater than 2.

2. The marker according to claim 1, wherein the n is equal to or less than 6.

3. The marker according to claim 2, wherein the detection object part of an m-th one of the plurality of optical units in the at least one arrangement direction is located at a position where a surface of the detection object part of the m-th one of the plurality of optical units crosses the image field, where m is equal to or greater than 2 and less than n.

4. The marker according to claim 1, wherein the detection object part of an m-th one of the plurality of optical units in the at least one arrangement direction is located at a position where a surface of the detection object part of the m-th one of the plurality of optical units crosses the image field, where m is equal to or greater than 2 and less than n.

5. The marker according to claim 4, wherein the m is equal to or greater than n/2.

* * * * *